May 15, 1956  H. E. SLOAN ET AL  2,745,671
WORK-HOLDING CHUCK

Filed June 8, 1953  5 Sheets-Sheet 1

Inventors:
Harry E. Sloan
and Linwood B. Swanson
by: Steward + Sprueget
Attorneys.

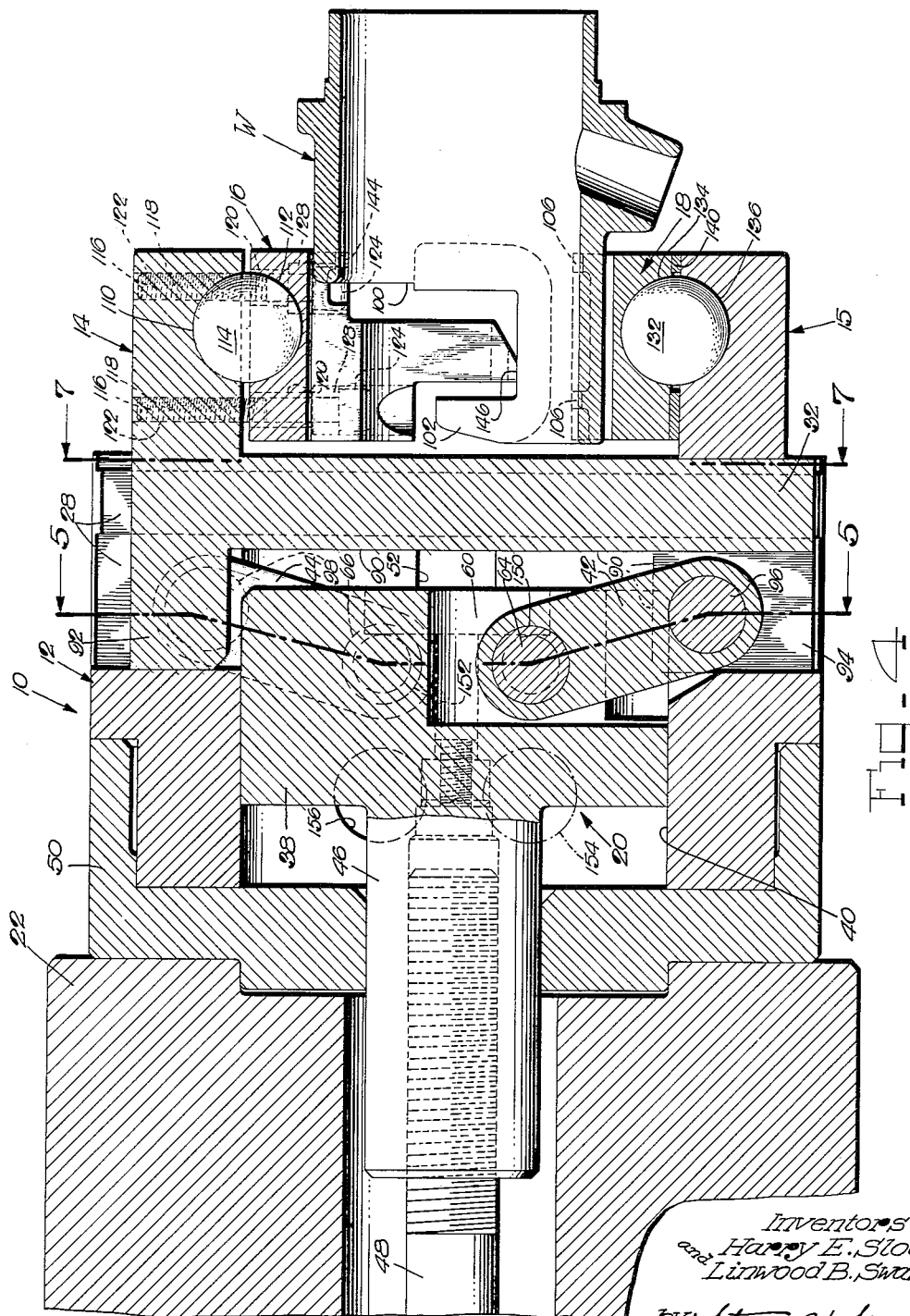

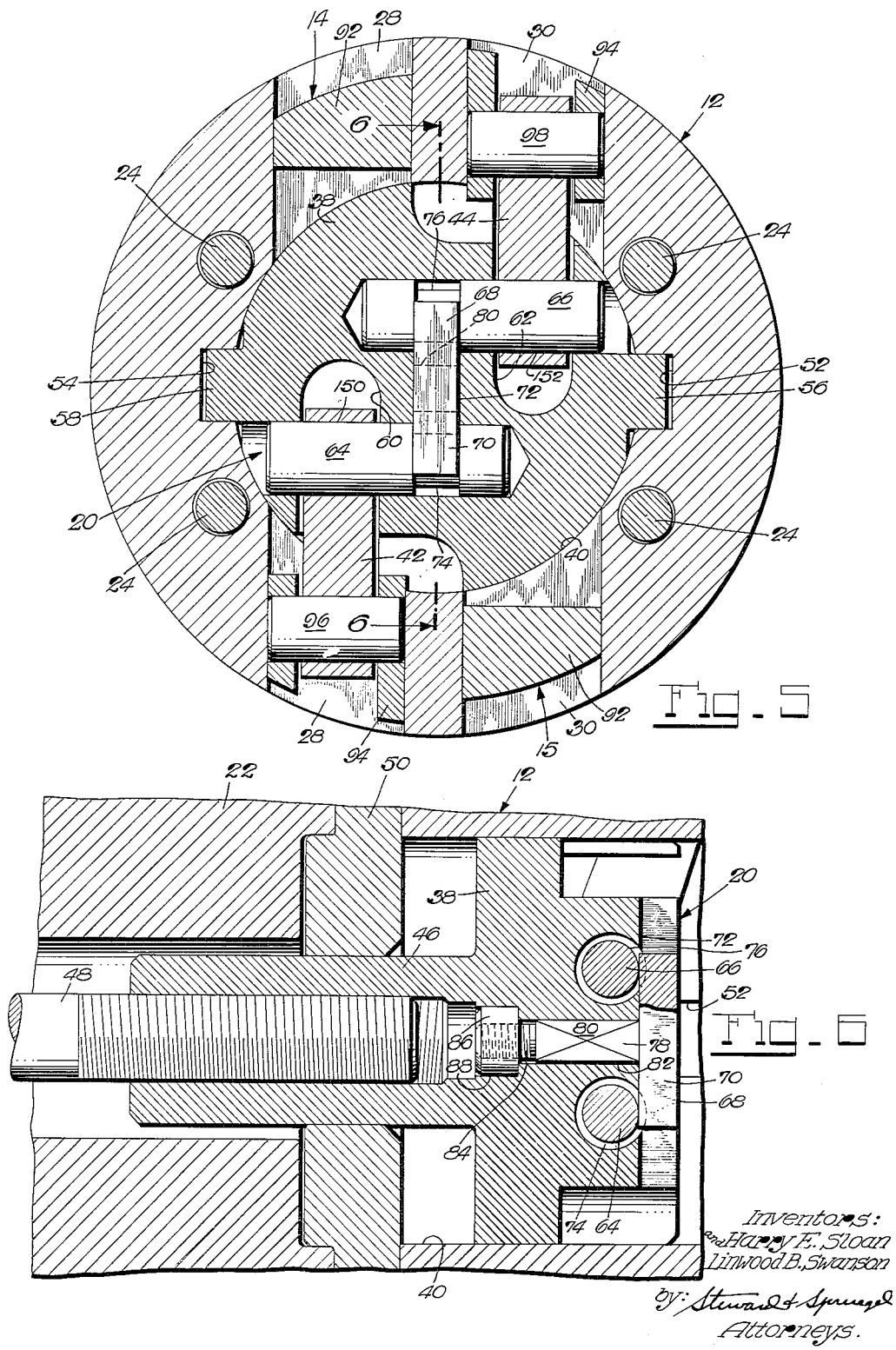

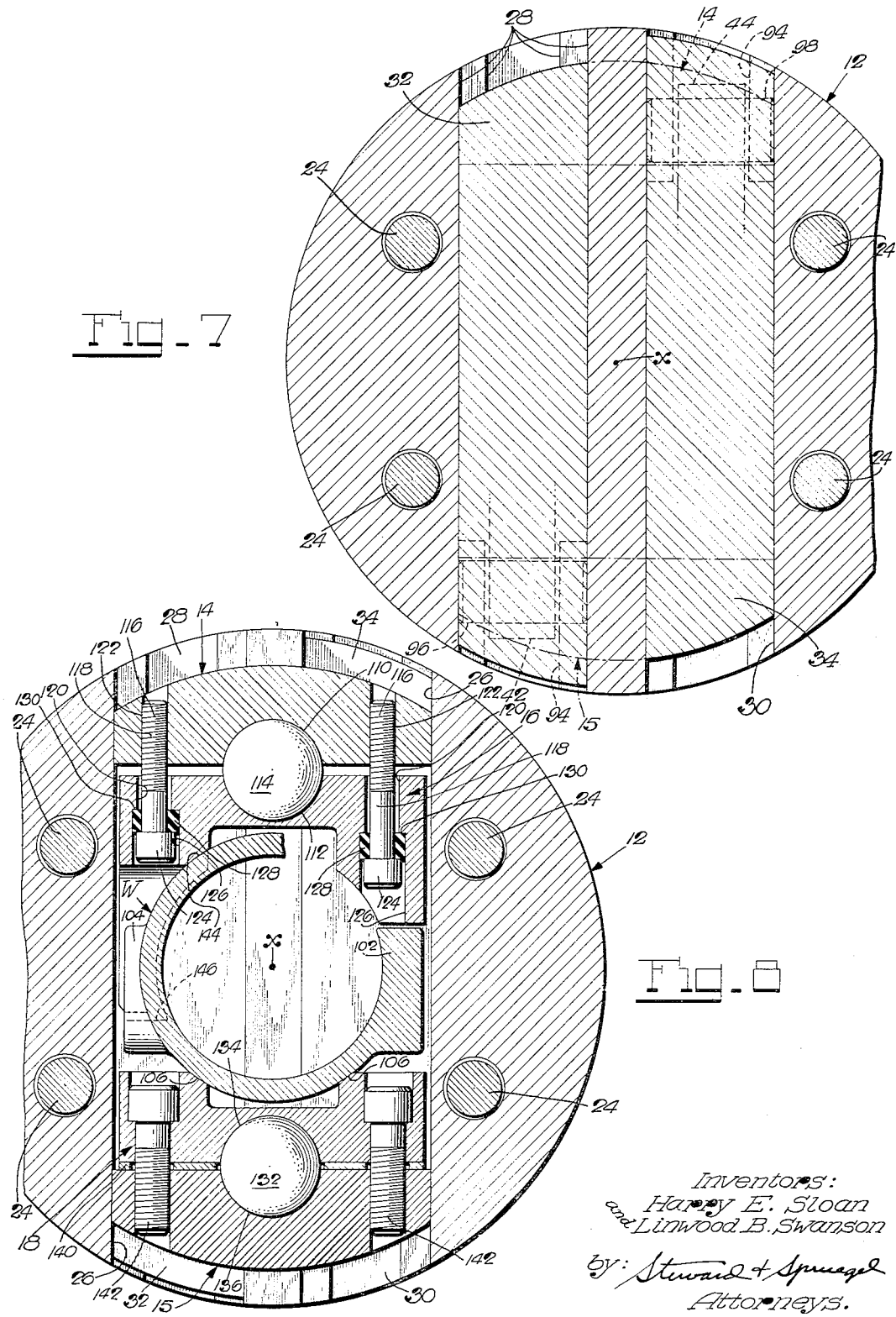

United States Patent Office 2,745,671
Patented May 15, 1956

2,745,671

WORK-HOLDING CHUCK

Harry E. Sloan, Hartford, and Linwood B. Swanson, New Britain, Conn., assignors to The Cushman Chuck Company, Hartford, Conn., a corporation of Connecticut Application June 8, 1953, Serial No. 360,137

8 Claims. (Cl. 279—119)

This invention relates to work-holding chucks in general, and to chucks of the guided jaw type in particular.

Previous chucks of this type are characterized by a chuck body having in its front radial guideways for the reception of the slides which carry the work-gripping jaws in forwardly projecting fashion and have in the rear operating connections with a common jaw actuating device. Since the guided lengths of these slides are necessarily shorter than the radius of the chuck body, it follows that the work-clamping forces applied to the slides at their operating connections with the common jaw actuator and the reactive forces from the work against the gripping surfaces of the jaws set up powerful couples in the slides which produce harmful bending stresses in the same and lead to early and excessive wear of both, the slides and their guideways, unless the chuck is made of a large diameter to obtain radial guideways and jaw slides of adequate lengths to render these couples harmless. In consequence, previous chucks of this type are excessively large and heavy, especially when built for heavy duty performance, and require for their safe operation heavy lathe or other machine tool installations.

It is an object of the present invention to provide a chuck of this type which, for performance comparable with that of previous chucks of this type, is much smaller and lighter than the latter and may be used on lighter machine tool installations for its safe performance.

It is another object of the present invention to provide a chuck of this type of which the chuck body has for the radial guidance of each movable jaw a guideway which extends substantially throughout the cross-sectional dimension or diameter of the chuck body, and each jaw slide is but slightly shorter than the guideway in which it is received, thereby to permit the aforementioned much smaller and lighter construction of a chuck of this type with hardly any wear of the jaw slides and their guideways even after long use of the chuck in heavy duty performance, and also permit the safe use of the chuck on relatively light machine tool installations.

It is a further object of the present invention to provide a chuck of this type of which radial guideways of the aforementioned diametrical extent in the chuck body are arranged therein to accommodate the but slightly shorter slides of work-gripping jaws which are diametrically opposite each other.

Another object of the present invention is to provide a chuck of this type of which the work-gripping jaws are carried by their respective slides at one end thereof and the latter are connected at their other ends with a common jaw actuator, so that the entire lengths of the jaw slides are subjected primarily to harmless tensile stresses and only to a negligible extent to harmful bending stresses that spring from the inevitable couples in these slides, thereby further reducing wear of the jaw slides and of their guideways and inhibiting any binding tendencies of the former in the latter, as well as effectively resisting so-called "bellmouthing" of the jaws which is a highly objectionable tendency of work-gripping jaws to tilt ever so slightly, but sufficiently to interfere with the accurate support of the gripped work, when their slides and the guideways in which they are received are worn even slightly.

A further object of the present invention is to provide a chuck of this type of which the work-gripping jaws are mounted on carriers which have the aforementioned slides in the guideways in the chuck body, and at least one of the jaws has a ball and socket connection with its carrier for self-adjustment of the jaw into uniform gripping engagement with work that is otherwise positively located in another jaw or jaws, thereby to achieve the support on a carrier of a jaw of the self-adjustable type in an exceedingly simple structural manner.

It is another object of the present invention to provide a chuck of this type with cooperating jaws for gripping work of which at least a part is cylindrical, and to provide one of the jaws, namely a work-locating jaw, with no fewer than four work support spots none of which is within the confines of a triangle formed by imaginary lines connecting the other spots, so that the work will positively and accurately be located, with less stress on the work than from a three-point grip on one side thereof, when the cylindrical part of the work is placed on these support spots, and the other jaw or jaws need not perform any work-locating function but merely hold the work against the support spots on the locating jaws.

It is a further object of the present invention to have in a chuck of this type the aforementioned work-locating jaw, and to provide a companion jaw of the aforementioned self-adjusting type which, for least work-deforming distribution of the stresses in the work springing from the powerful grip thereon by the jaws, is made to engage the work at desirable places thereof, thereby to assure positive and accurate location of any of a number of identical workpieces on the locating jaw and its secure retention thereon despite even considerable variations or tolerances in the individual workpieces such as commonly occur in cast workpieces, for instance.

Further objects and advantages will appear to those skilled in the art from the following, considered in conjunction with the accompanying drawings.

In the accompanying drawings, in which certain modes of carrying out the present invention are shown for illustrative purposes:

Fig. 4 is a longitudinal section through the mounted chuck, taken in part on the line 4—4 of Fig. 3;

Fig. 5 is a cross-section through the chuck, taken substantially on the line 5—5 of Fig. 4;

Fig. 6 is a fragmentary longitudinal section through the chuck as taken on the line 6—6 of Fig. 5;

Fig. 7 is a cross-section through the chuck as taken on the line 7—7 of Fig. 4; and Fig. 8 is a fragmentary cross-section through the chuck, taken substantially along the irregular line 8—8 of Fig. 3.

Figure 1:
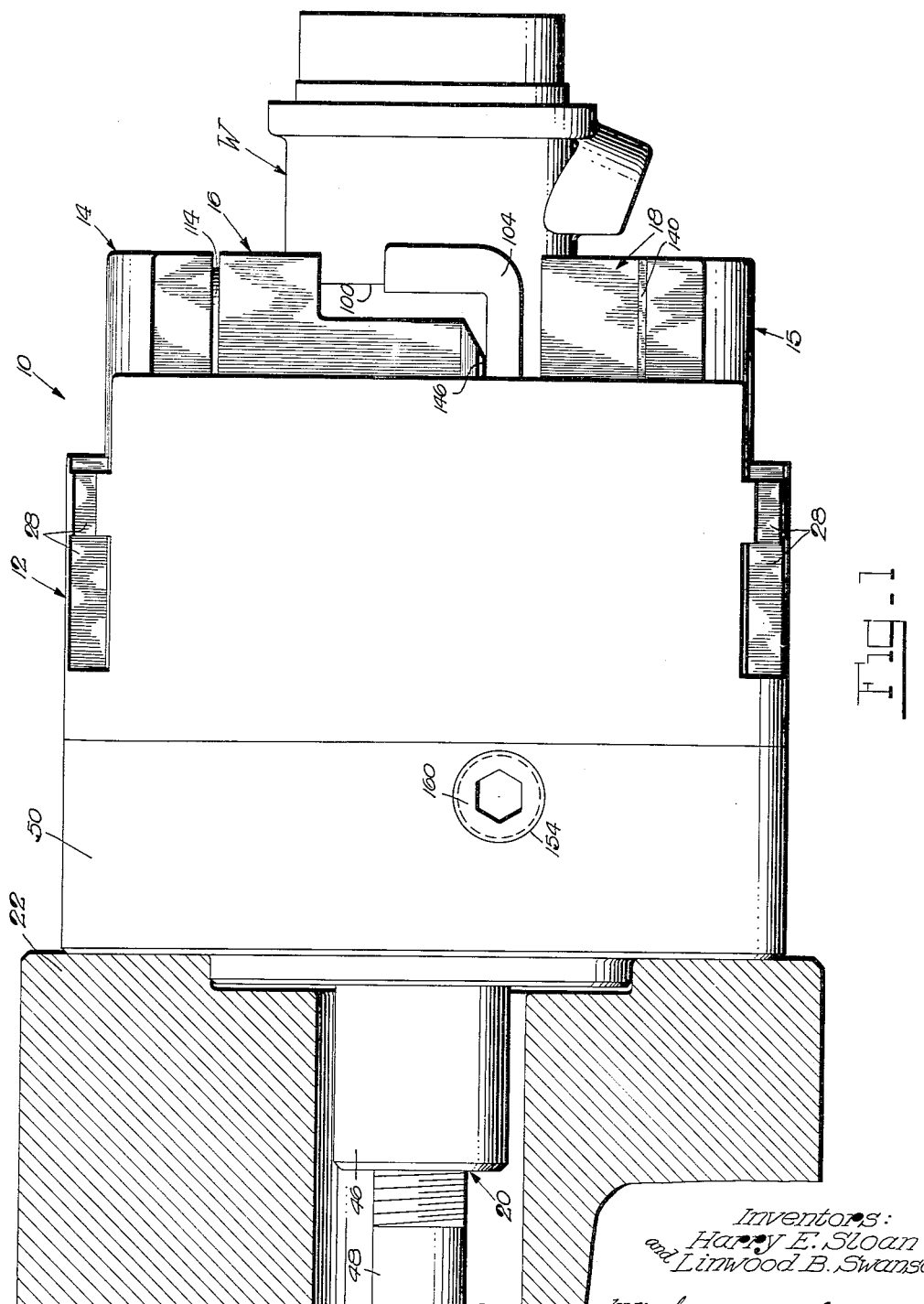
Fig. 1 is a side view of a mounted chuck embodying the present invention.

Referring to the drawings, and more particularly to Figs. 1 to 4 thereof, the reference numeral 10 designates a chuck which comprises a chuck body 12, jaw carriers 14 and 15 for work-gripping jaws 16 and 18, respectively, and jaw-operating mechanism 20. The chuck may removably be mounted on the power spindle 22 of a lathe or other machine tool by having its body 12 bolted thereto as at 24.

The body 12 is, in the present instance, provided in its front with a machined groove 26 (Figs. 2, 3, and 8) which extends diametrically of the body 12 and is open to two machined guideways 28 and 30 in the latter. As shown in Figs. 2, 3, 7 and 8, the guideways 28 and 30 are parallel to the machined groove 26, and it is significant that these guideways 28 and 30 are arranged side-by-side with each other and are equally spaced from the longitudinal axis $x$ of the body 12. It is further significant that the guideways 28 and 30 extend throughout the transverse dimensions of the body thereat (Fig. 7). The guideways 28 and 30 are adapted for the reception of slides 32 and 34, respectively, which in this instance are formed integrally with the jaw carriers 14 and 15, respectively. Further significant is the fact that the slides 32 and 34 are substantially as long, or nearly as long, as their respective guideways 28 and 30 (Figs. 4 and 7). The guideways 28 and 30 are conveniently machined into T-shape (Fig. 3) for the secure retention therein of the slides 32 and 34 without the provision of removable gibs. The jaw carriers 14 and 15 extend laterally beyond their respective slides 32 and 34 (Figs. 2, 3 and 8) so as to be diametrically opposite each other for the centralized mounting thereon of the jaws 16 and 18 in diametric opposition to each other.

The jaw-operating mechanism 20 comprises, in the present instance, an operating plunger 38 (Figs. 4 to 6) which is slidable in an annular recess 40 in the chuck body 12 and is operatively connected by toggle links 42 and 44 with the slides 32 and 34, respectively. The annular recess 40 extends for some distance into the guideways 28 and 30 (Fig. 4). The plunger 38 has a rearwardly extending rod or shank 46 which is connected, in this instance threadedly, with an operating bar 48 that extends through the power spindle 22 (Fig. 4). The shank 46 of the operating plunger 38 may be guided in an adapter member 50 which is interposed between the power spindle 22 and the chuck body 12 and may be considered a removable part of the latter to admit the plunger 38 into, and permit its removal from, the annular recess 40 when the chuck is not mounted on a lathe or other machine tool. The annular wall of the recess 40 in the chuck body 12 is provided with diametrically opposite machined grooves 52 and 54 in which longitudinal ribs 56 and 58 on the plunger 38 are received with a sliding fit (Fig. 5), thus establishing a spline connection between the chuck body 12 and the plunger 38 to permit axial movement of the latter in the chuck body but hold it against rotation relative thereto. The plunger 38 is on opposite sides of its longitudinal axis recessed at 60 and 62 (Figs. 4 and 5) for the reception of the toggle links 42 and 44 in line with the slides 32 and 34, respectively. The toggle links 42 and 44 are connected at their inner ends with the plunger 38 by pivot pins 64 and 66, respectively, which may securely be locked in the plunger by a T-bolt 68 having a head 70 received in a transverse groove 72 in the plunger end and extending into peripheral grooves 74 and 76 in the pivot pins 64 and 66, respectively (Figs. 5 and 6). The bolt 68 has a shank 78 of which a length 80 is square and received in a square hole 82 in the plunger to prevent turning of the bolt 68, and an end length 84 of the shank 78 is reduced and threaded for the reception of a nut 86 which is seated in a counterbore 88 in the plunger (Fig. 6). Each of the slides 32 and 34 is in its rear recessed at 90 (Fig. 4) to leave lugs 92 and 94 at its opposite ends between which the plunger 38 may move (see also Fig. 5). The lugs 94 of the slides 32 and 34 are bifurcated for the reception of the aligned toggle links 42 and 44, respectively, and their connection therewith by means of pivot pins 96 and 98, respectively. Accordingly, on moving the operating bar 48 in opposite directions, the jaws 16 and 18 on the carriers 14 and 15 will be moved into and from gripping engagement with work W through intermediation of the plunger 38, toggle links 42 and 44 and slides 32 and 34. It follows from Fig. 4 that the jaws 16 and 18 will be moved into work-gripping position when the plunger 38 is shifted to the right, whereby the toggle links 42 and 44 are moved closer toward longitudinal alignment with each other, with the result that the jaws 16 and 18 close on the work in harmonic motion fashion, i. e. at decreasing speed, and thus gradually apply their full clamping forces to the work, and the toggle links 42 and 44 become self-locking to an extent which is assuredly sufficient to prevent centrifugal forces of even exceptional magnitude in the carriers and their jaws from unlocking these toggle links. In this connection, the arrangement of the spline connections 52, 56 between the chuck body 12 and the plunger 38 in close proximity to the link connections 64 and 66 with the plunger is advantageous in that the plunger itself is subjected to only negligible torsional stresses.

Figure 2:
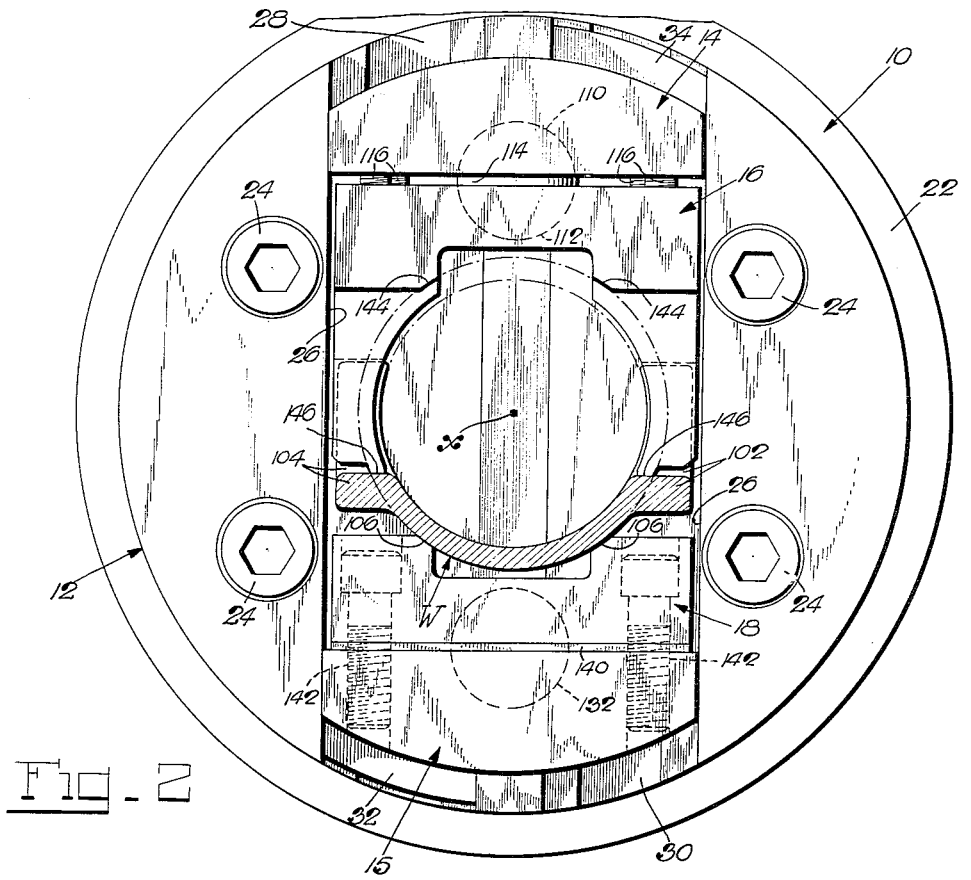
Fig. 2 is a front view of the chuck.

The jaws 16 and 18 are, in the present instance, adapted to grip work W which is at least in part cylindrical. Thus, the work W shown by way of example in the drawings is of tubular form having a cylindrical periphery which is interrupted at 100 and there provided with opposite outwardly extending, channeled lugs 102 and 104 (Figs. 2, 4 and 8). To accommodate this exemplary work W, or for that matter any other work which is at least in part cylindrical, the jaw 18 is in this instance adapted accurately to locate the work by receiving a cylindrical portion thereof, and is fixed on its carrier 15. Experiments have shown that cylindrical work may be located on four supporting points as accurately as on three supporting points, provided that any one of the four supporting points is outside the confines of a triangle formed by imaginary lines connecting the other three supporting points. Accordingly, the jaw 18 has four work-supporting surfaces 106 which may or may not conform to the cylindrical shape of the work located thereon, and are preferably of relatively small area and, hence, referred to hereinafter as "support spots." These support spots 106 are arranged in pairs on opposite sides, respectively, of the longitudinal axis of the work W (Figs. 2 and 8), and the support spots of each pair are spaced longitudinally of the work (Fig. 4). Of course, more than four support spots 106 may be provided on the jaw 18, but the work will be seated on only those four of the support spots whose relative disposition conforms closest to the cylindrical shape of the work, unless all support spots equally conform in their relative disposition to the cylindrical shape of the work. While it has been mentioned heretofore that a three point support for cylindrical work will locate the latter as accurately as a four point support, a four point work support such as provided on the jaw 18 is advantageous over a three point support in that it affords a more secure grip on the work that is not liable to be loosened even momentarily when the work should be jarred in the course of its machining, and also requires smaller specific clamping pressure against any part of the work for the secure retention of the latter on the jaw.

The other jaw 16 is, in the present instance, a self-adjusting jaw which will hold any one of a number of identical workpieces W uniformly against the fixed work-locating jaw 18 despite sligtht variations or tolerances in these workpieces, especially when they are non-machined castings. To this end, the jaw carrier 14 and jaw 16 are provided with semispherical sockets 110 and 112, respectively, in which is seated a steel ball 114 that spaces the jaw 16 from its carrier 14 sufficiently to permit limited universal rotation of the former relative to the latter. In order to hold the jaw 16 on its carrier 14 without interfering with the aforementioned limited universal rotatability of the former relative to the latter, there are provided a plurality of screws 116, in this instance four. The screws 116 have shanks 118 which extend with considerable clearance through holes 120 in the jaw 16 and are threadedly received in tapped holes 122 in the carrier 14 (Figs. 4 and 8). The heads 124 of the screws 116 are received with considerable clearance in counterbores 126 in the jaw 16, and the latter is oriented on the screws 116 by means of spacer rings 128 which are snugly interposed between the shanks 118 of the screws 116 and the counterbores 126 on the one hand, and between the heads 124 of these screws and annular shoulders 130 in the jaw 16 on the other hand (Fig. 8). The spacer rings 128 are made of any suitable resiliently compressible material, such as relatively soft rubber, for instance, so that the screws 116 and the spacer rings 128 securely hold the jaw 16 on its carrier 14 and nevertheless permit the aforementioned limited universal rotatability of the former relative to the latter.

To achieve accurate alignment of the jaws 16 and 18 in a most facile manner, the fixed jaw 18 is preferably located on its carrier 15 also by a steel ball 132 (Figs. 4 and 8) which is seated in semispherical sockets 134 and 136 in the jaw 18 and its carrier 15, respectively. In order that both carriers 14 and 15 may conveniently be machined alike for the accurate location of the respective jaws 16 and 18 thereon, the semispherical sockets 134 and 136 in the fixed jaw 18 and carrier 15, respectively, are preferably exactly like the corresponding sockets in the self-adjustable jaw 16 and its carrier 14, and the ball 132 is identical with the ball 114. The work-locating jaw 18, being a fixed jaw as mentioned hereinbefore, is not permitted to turn in any direction relative to its carrier 15. To this end, a shim 140 is interposed in the space between the jaw 18 and its carrier 15 (Figs. 4 and 8), and dowel pins (not shown) and a plurality of bolts 142 serve to locate and secure the jaw 18 to its carrier 15.

The self-adjustable jaw 16 has in this instance also several work support spots 144 and 146 of which the support spots 144 are provided at the front of the jaw on opposite sides of the longitudinal axis of the work W and engage the cylindrical periphery of the latter (Figs. 2, 4 and 8), while the support spots 146 are provided further to the rear of the jaw on opposite sides of the longitudinal axis of the work W and engage the outwardly projecting work lugs 102 and 104 in the channels therein.

Figure 3:
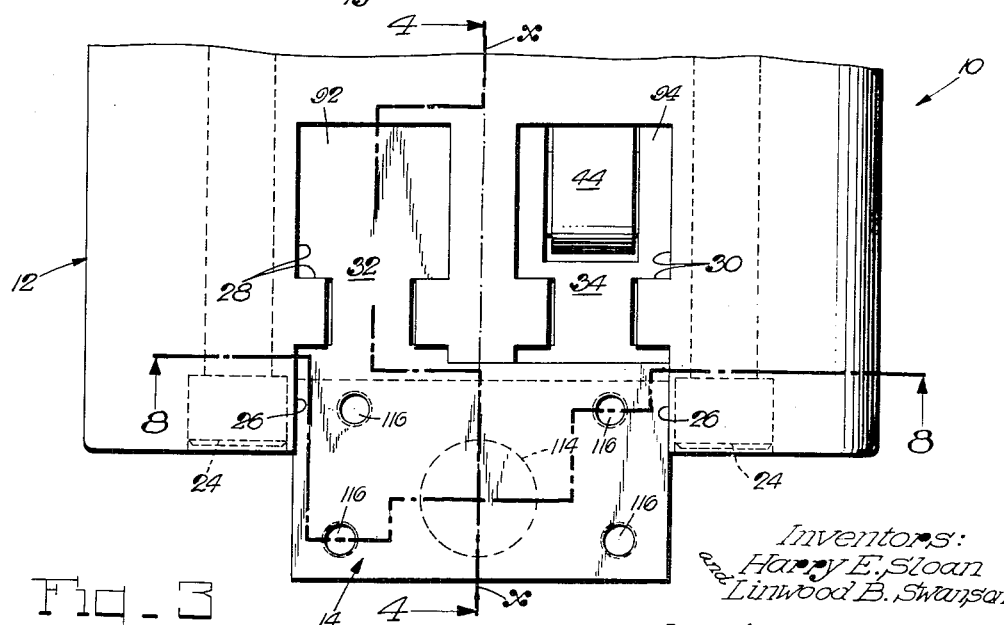
Fig. 3 is a fragmentary top view of the chuck.

The extension of the guideways 28 and 30 throughout the transverse dimensions of the chuck body 12 thereat and the provision of the guides 32 and 34 of nearly the same lengths as the respective guideways 28 and 30 in which they are received, is highly significant and advantageous in that it permits the aforementioned much smaller and lighter construction of a chuck of the guided jaw type with hardly any wear of the slides 32 and 34 and their respective guideways 28 and 30 even after long use of the chuck in heavy duty performance, and also permits the safe use of the chuck on relatively light machine tool installations. Further, by providing the jaw carriers 14 and 15 at one end of their respective slides 32 and 34 and connecting the toggle links 42 and 44 of the jaw-operating mechanism 20 with the other ends of the slides 32 and 34, respectively, the entire lengths of these slides are subjected primarily to harmless tensile stresses and only to a negligible extent to harmful bending stresses that spring from the inevitable couples in these slides, thereby further reducing wear of the slides and their respective guideways and inhibiting any binding tendencies of the former in the latter, as well as effectively resisting the hereinbefore mentioned bellmouthing of the carriers 14 and 15 and their jaws 16 and 18. Also, while the jaw carriers 14 and 15 are laterally offset from their respective slides 32 and 34 and the vectors of the work-gripping forces transmitted by the jaw carriers to their jaws are directed radially of the chuck body and, hence, are also offset from the slides 32 and 34 and have a tendency to tilt the latter in their respective guideways 28 and 30, this tendency is negligible and is even further minimized by the guidance of a part of each jaw carrier 14 and 15 in the described machined front groove 26 in the chuck body 12 which therefore serves as a guide groove (Figs. 2 and 3). To permit the self-adjusting jaw 16 to have the aforementioned limited universal rotatability on its carrier 14, the former is sufficiently spaced from the guide groove 26 in the front of the chuck body 12 (Figs. 2 and 8). Preferably, the fixed jaw 18 on the carrier 15 is similarly spaced from the guide groove 26 (Fig. 2).

The jaw carriers 14 and 15 may with their slides 32 and 34 be inserted endwise in their respective guideways 28 and 30 in the chuck body 12. In fact, the slides 32 and 34 may thus be inserted in their respective guideways 28 and 30 while they are already connected with the toggle links 42 and 44. After insertion of the slides 32 and 34 in the guideways 28 and 30 they may be moved into a position therein in which the holes 150 and 152 for the pivot pins 64 and 66 in the toggle links 42 and 44, respectively, may be aligned with holes 154 and 156, respectively, in the chuck body 12 and the adapter member 50 (Figs. 1 and 4) through which to insert the pivot pins 64 and 66 into their aligned reception holes in the plunger 38 and the aligned holes 150 and 152 in the toggle links 42 and 44, as will be readily understood. Normally, both holes 154 and 156 are preferably plugged at 160 (Fig. 1).

While the exemplary chuck shown in the drawings and described herein is adapted for gripping work externally, it is obvious that the same could be used with equal advantage for gripping work internally on making certain self-evident changes in the chuck to that end. Further, it is fully within the purview of the present invention to have the fixed work-locating jaw 18 immovably mounted on the chuck body and only move the self-adjusting jaw 16 toward and away from the fixed jaw 18, and vice versa. Also, the present invention is by no means limited to only two jaw carriers whose slides are nearly as long as their transverse guideways in the chuck body, for the slides of additional jaw carriers could readily be accommodated in transverse guideways in the chuck body 12 which are spaced rearwardly from the guideways 28 and 30.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A chuck, comprising a body with a longitudinal axis; opposite work-gripping jaws, said body having in its front two substantially parallel transverse guideways on opposite sides of and spaced from said body axis and extending throughout the transverse dimensions of said body thereat; slides carrying said jaws, respectively, diametrically opposite each other, said slides being received in said guideways, respectively, extending therein substantially throughout the lengths of the latter for radial guidance of said jaws into and from gripping engagement with work and having rearward extensions thereon; and jaw-operating mechanism in said body comprising a member non-rotatably mounted in the body for reciprocation axially thereof rearwardly of the guideways therein, and further comprising toggle links connecting said member with said rearward extensions on said slides, respectively, for simultaneously moving the slides to bring said jaws into and from gripping engagement with work.

2. A chuck, comprising a body with a longitudinal axis; opposite work-gripping jaws, said body having in its front two substantially parallel transverse guideways on opposite sides of and spaced from said body axis and extending throughout the transverse dimensions of said body thereat; slides carrying said jaws, respectively, diametrically opposite each other, each jaw being carried at one end of its slide and projecting forwardly therefrom, said slides being received in said guideways, respectively, extending therein substantially throughout the lengths of the latter for radial guidance of said jaws into and from gripping engagement with work and having rearward extensions thereon, each such rearward extension being at the end of its slide opposite to the end carrying the jaw; and jaw-operating mechanism in said body comprising a member non-rotatably mounted in the body for reciprocation axially thereof rearwardly of the guideways therein, and further comprising toggle links connecting said member with said rearward extensions on said slides, respectively, for simultaneously moving them to bring said jaws into and from gripping engagement with work.

3. A chuck, comprising a body with a longitudinal axis having in its front two first parallel transverse guideways on opposite sides of and spaced from said body axis and extending throughout the transverse dimensions of said body thereat, and another transverse guideway in front of and open to said first guideways, said other guideway extending parallel to said first guideways and diametrically of said body throughout its transverse dimension thereat; slides received in said first guideways, respectively, and extending therein substantially throughout the lengths of the latter; jaw carriers on said slides, respectively, received for radial guidance in said other guideway; work-gripping jaws on said carriers, respectively; and jaw-operating mechanism in said body operatively connected with said slides for simultaneously moving them to bring said jaws into and from gripping engagement with work.

4. A chuck as set forth in claim 3, in which said jaw carriers are formed integrally with their respective slides.

5. A chuck as set forth in claim 3, in which each carrier is formed integrally with its slide at one end of the latter, and said jaw-operating mechanism is operatively connected with said slides at their other ends.

6. A chuck, comprising a body; angularly spaced jaws on said body, said jaws being relatively movable to grip and release work, and said jaws, except one jaw, having work-gripping surfaces on which to locate work relative to said body, and said one jaw comprising a jaw carrier and a jaw proper having a work-gripping surface conforming to the shape of the work and being provided in its opposite surface with a semispherical socket, and said carrier having a surface facing work being gripped and provided with a semispherical socket; a steel ball seated in said sockets in said jaw proper and carrier and spacing the former from the latter to permit limited universal rotation of said jaw proper relative to said carrier; and a flexible connection between said jaw proper and carrier to hold the former on the latter and permit self-adjustment of said jaw proper to work being gripped.

7. A chuck, comprising a body having a longitudinal axis and transverse guideways; diametrically opposite jaws adapted to grip work; slides carrying said jaws, respectively, and being received in said guideways, respectively, for radial guidance of said jaws into and from gripping engagement with work, one of said jaws being fixed on its slide and having a work-gripping surface on which to locate work relative to said body, and the other jaw having a work-gripping surface conforming to the shape of the work; a ball and socket connection between said other jaw and its slide to permit limited universal rotation of the former relative to the latter for self-adjustment of said other jaw to work being gripped, the fixed connection of said one jaw on its slide including a ball and socket connection therebetween identical with that between said other jaw and its slide, and means firmly securing said one jaw to its slide against any rotation relative to the latter; and jaw-operating mechanism in said body operatively connected with said slides for simultaneously moving them to bring said jaws into and from gripping engagement with work.

8. A chuck for gripping work of at least partial cylindrical shape, comprising a body having a longitudinal axis and opposite guideways; two work-gripping jaws; slides carrying said jaws, respectively, and received in said guideways, respectively, for radial guidance of said jaws into and from gripping engagement with work, one of said jaws having at least four support spots on which to place a cylindrical portion of work and accurately locate the latter relative to said body, any one of said support spots lying outside the confines of a triangle formed by imaginary lines connecting the other support spots, the other jaw having a work-gripping surface conforming to the shape of the work and being provided in its opposite surface with a semispherical socket, and the slide for said other jaw having a surface facing said one jaw and being provided with a semispherical socket; a steel ball seated in said sockets in said other jaw and its slide and spacing the former from the latter to permit limited universal rotation of said other jaw relative to its slide; a flexible connection between said other jaw and its slide to hold the former on the latter and permit self-adjustment of said other jaw to work being gripped; and jaw-operating mechanism in said body operatively connected with said slides for simultaneously moving them to bring said jaws into and from gripping engagement with work.

References Cited in the file of this patent

UNITED STATES PATENTS

| | | |
|---|---|---|
| 396,035 | Felt | Jan. 8, 1889 |
| 746,707 | Jecklin | Dec. 15, 1903 |
| 1,274,685 | Cline | Aug. 6, 1918 |
| 1,813,705 | Lewis | July 7, 1931 |
| 2,442,668 | Stace | June 1, 1948 |
| 2,657,068 | Sloan | Oct. 27, 1953 |

FOREIGN PATENTS

| | | |
|---|---|---|
| 40,350 | Germany | July 1, 1907 |